(12) United States Patent
Hata

(10) Patent No.: US 8,692,925 B2
(45) Date of Patent: Apr. 8, 2014

(54) OPTICAL SYSTEM DRIVE DEVICE, IMAGE CAPTURE DEVICE PROVIDED WITH OPTICAL SYSTEM DRIVE DEVICE, AND MOBILE DEVICE MOUNTED WITH IMAGE CAPTURE DEVICE

(75) Inventor: Kazuhiro Hata, Shiga (JP)

(73) Assignee: Panasonic Corporation, Osaka (JP)

( * ) Notice: Subject to any disclaimer, the term of this patent is extended or adjusted under 35 U.S.C. 154(b) by 308 days.

(21) Appl. No.: 13/378,465

(22) PCT Filed: Jan. 13, 2011

(86) PCT No.: PCT/JP2011/000125
§ 371 (c)(1),
(2), (4) Date: Dec. 15, 2011

(87) PCT Pub. No.: WO2011/114604
PCT Pub. Date: Sep. 22, 2011

(65) Prior Publication Data
US 2012/0092547 A1    Apr. 19, 2012

(30) Foreign Application Priority Data

Mar. 15, 2010   (JP) .................................. 2010-057056

(51) Int. Cl.
*H04N 5/225*      (2006.01)
*H04N 5/232*      (2006.01)

(52) U.S. Cl.
USPC .......................................... 348/340; 348/345

(58) Field of Classification Search
CPC ............ H04N 5/23212; H04N 5/2251; H04N 5/2253; H04N 5/2254
USPC .......................... 348/294, 335, 340, 345, 374; 250/208.1, 239; 257/432, 433, 434, 257/680; 359/811, 819, 823, 824; 396/55, 396/133, 144, 529, 535
See application file for complete search history.

(56) References Cited

U.S. PATENT DOCUMENTS

| | | | |
|---|---|---|---|
| 7,974,025 B2 * | 7/2011 | Topliss | 359/823 |
| 8,446,475 B2 * | 5/2013 | Topliss et al. | 348/208.11 |
| 2008/0278590 A1 | 11/2008 | Tanimura | |

FOREIGN PATENT DOCUMENTS

| | | |
|---|---|---|
| EP | 2072001 A2 | 6/2009 |
| EP | 2072001 A3 | 11/2010 |

(Continued)

OTHER PUBLICATIONS

International Application Serial No. PCT/JP2011/000125, International Search Report mailed Apr. 12, 2011, 2 pgs.

*Primary Examiner* — Lin Ye
*Assistant Examiner* — Chriss Yoder, III
(74) *Attorney, Agent, or Firm* — RatnerPrestia

(57) ABSTRACT

An optical system drive device, an image capture device, and a mobile device of the invention includes: an optical system; a urging member; a shape-memory alloy actuator; a current applying section for supplying a current to the actuator; a measurement section for measuring a characteristic value of the actuator; a driving control section for controlling the supply current to the current applying section according to the characteristic value measured by the measurement section; and a signal output section for outputting prescribed signal to the driving control section when the characteristic value of the actuator measured by the measurement section reaches a value corresponding to a target position of the optical system while making the shape-memory alloy of the actuator change the length at least in an extending mode when moving the optical system to the target position.

18 Claims, 4 Drawing Sheets

(56) References Cited

FOREIGN PATENT DOCUMENTS

| | | | |
|---|---|---|---|
| JP | 2008280879 A | 11/2008 |
| JP | 2009531729 A | 9/2009 |
| JP | 2010020104 A | 1/2010 |
| WO | WO-2008099156 A2 | 8/2008 |
| WO | WO-2008099156 A3 | 8/2008 |

* cited by examiner

FIG. 1A
FIG. 1B
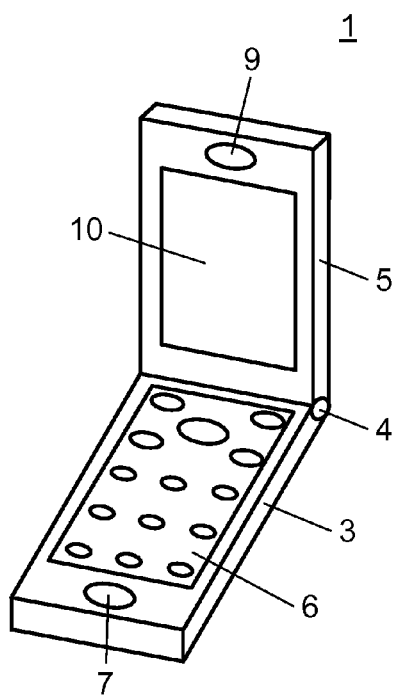
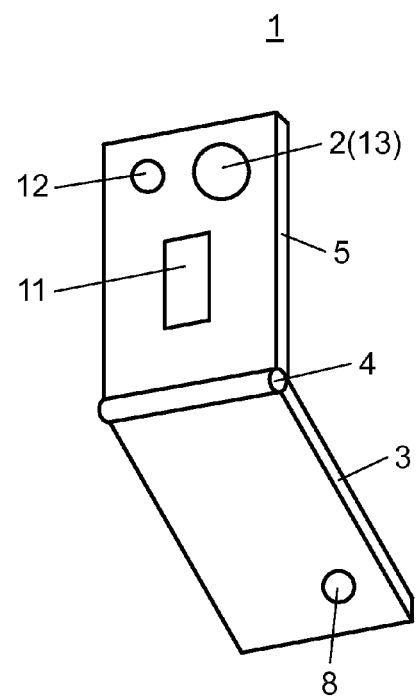

OPTICAL SYSTEM DRIVE DEVICE, IMAGE CAPTURE DEVICE PROVIDED WITH OPTICAL SYSTEM DRIVE DEVICE, AND MOBILE DEVICE MOUNTED WITH IMAGE CAPTURE DEVICE

This Application is a U.S. National Phase Application of PCT International Application No. PCT/JP2011/000125.

TECHNICAL FIELD

The present invention relates to an optical system drive device, an image capture device provided with an optical system drive device, and a mobile device such as a digital camera, a mobile phone having a camera function, or a portable information terminal (PDA) mounted with the image capture device.

BACKGROUND ART

In the past, as image capture devices, there have been known image capture devices having a lens that is movable in the optical axis direction and an imaging element that receives light through lenses. Such image capture devices are configured such that the autofocus control, which controls the position of the lens in a stepwise fashion, can be executed in order to obtain image capturing data for each field of the focus areas. As the lens moves, a decrease in a focus estimation value, for example, a detected contrast value is checked, thereby recognizing the position of the lens at the focus estimation value, from which the decrease starts, as a target lens position. Such image capture devices employ an actuator using shape-memory alloy in order to move a driven section which has the lens (for example, refer to Patent Literature 1 to 3).

The shape-memory alloy used in the actuator has, for example, a wire shape, and thus its shape is changeable in the lengthwise direction. When the shape-memory alloy is heated up, the temperature thereof increases, and the alloy contracts in the lengthwise direction. In contrast, when the shape-memory alloy is cooled down, the temperature thereof decreases, and the alloy extends in the lengthwise direction.

By using an actuator using the shape-memory alloy with such a characteristic and an urging member, the position of the driven section is controlled. For example, a position (a ZERO position), where the shape-memory alloy to which current is not applied and which is not heated to be at the room temperature holds the position of the driven section against elastic force generated by the urging member, is set as a position closer to the imaging element side than the position at infinity. By applying current to the shape-memory alloy so as to heat the alloy, in the actuator, the shape-memory alloy contracts in the lengthwise direction, thereby maximally moving the driven section from the ZERO position to the closest point position. Next, in a case where the driven section is returned to the ZERO position again, the actuator stops the heating by shutting off the current application to the shape-memory alloy and so on, and naturally dissipates the heat and so on, thereby cooling down the shape-memory alloy. In such a manner, the shape-memory alloy extends in the lengthwise direction, thereby moving the driven section to the ZERO position against the elastic force generated by the urging member.

However, in the conventional image capture device, in a case where the driven section is moved to a prescribed position and thereafter the driven section is moved to another position, by cooling down the shape-memory alloy, the driven section is moved to the ZERO position, and then by heating up the shape-memory alloy, the driven section is moved to another position. Accordingly, in the conventional image capture device, when the driven section is moved from the prescribed position to another position, it passes the ZERO position. Hence, in the range from the prescribed position to the ZERO position, the driven section is moved by naturally cooling down the shape-memory alloy. Accordingly, response thereof is poor, and a long time is necessary therefor.

The shape-memory alloy has problems in that, in order to move the driven section by the natural cooling, the variation in the time for the movement is caused by individual difference in the shape-memory alloy or the ambient temperature, and thus further extra time therefor is necessary.

CITATION LIST

Patent Literature

Patent Literature 1: International Publication No. 2008/099156
Patent Literature 2: Japanese Unexamined Patent Application Publication No. 2008-280879
Patent Literature 3: PCT Japanese Translation Patent Publication No. 2009-531729

SUMMARY OF THE INVENTION

An optical system drive device of the present invention includes: an optical system movable in a moving range; an urging member urging the optical system in an optical axis direction; a shape-memory alloy actuator for moving the optical system in the optical axis direction; a current applying section for supplying a current to the actuator; and a measurement section for measuring a characteristic value of the actuator. In addition, the optical system drive device includes: a driving control section for controlling the supply current to the current applying section according to the characteristic value measured by the measurement section; and a signal output section for outputting a prescribed signal to the driving control section when the characteristic value of the actuator measured by the measurement section reaches a value corresponding to a target position of the optical system while making the shape-memory alloy of the actuator change the length at least in an extending mode when moving the optical system to the target position.

With such a configuration, when the optical system is moved to the target position, the driving control section controls the applied current so as to reduce the heat applied to the shape-memory alloy. Thereby, the temperature of the shape-memory alloy is lowered and the shape-memory alloy is changed the length in an extending direction mode, and then the optical system is moved toward the prescribed direction. When the characteristic value of the shape-memory alloy measured by the measurement section reaches the value corresponding to the target position, by outputting the prescribed signal to the driving control section through the signal output section, the optical system can be moved to the target position. As a result, when the optical system is moved to the target position, in practice, the shape-memory alloy is naturally cooled down. In the prior art, the optical system is moved to the target position through the ZERO position, and thus the time for moving the optical system to the target position increases. In contrast, in the present invention, the optical system can be moved to the target position without passing the ZERO position, and thus it is possible to shorten the time for moving the optical system to the target position.

BRIEF DESCRIPTION OF DRAWINGS

FIG. 1A is a perspective view of an entire mobile device according to an embodiment of the present invention.

FIG. 1B is a perspective view of the entire mobile device according to the embodiment of the present invention as viewed from another direction.

DESCRIPTION OF EMBODIMENTS

Figure 2A:
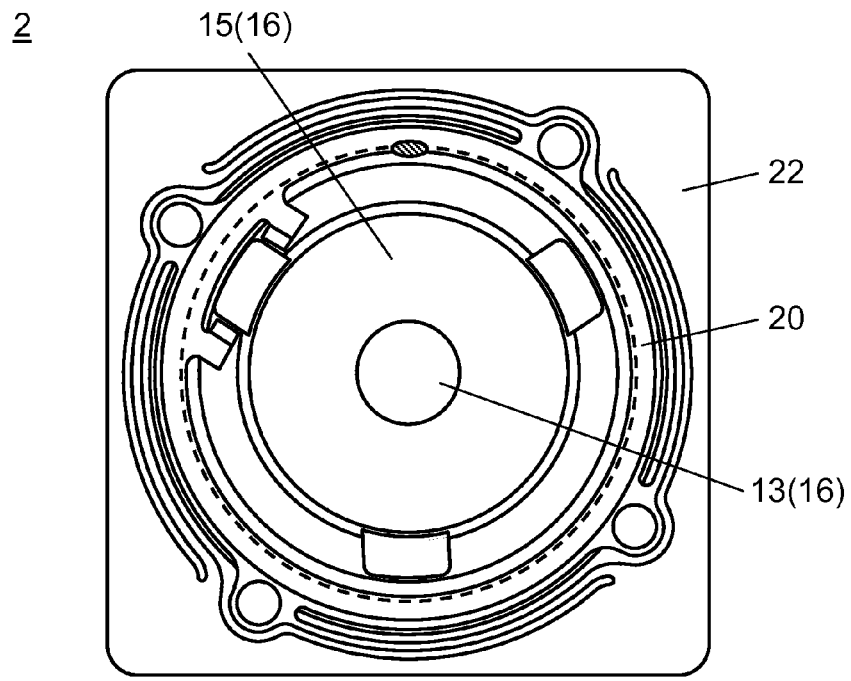
FIG. 2A is a top plan view of an entire image capture device according to the embodiment of the present invention.

Hereinafter, an embodiment of a mobile device according to the present invention will be described with reference to FIGS. 1A and 1B to 4A and 4B. First, a schematic configuration of the mobile device according to the embodiment will be described with reference to FIGS. 1A and 1B. FIGS. 1A and 1B are overall views of the mobile device according to the embodiment. The mobile device according to the embodiment is so-called folder type mobile phone 1. FIG. 1A is a perspective view of folder type mobile phone 1 in a state where it is opened as viewed from a direction in which a main screen (first display 10 to be described later) is visible. FIG. 1B is a perspective view of the mobile phone 1 shown in FIG. 1A as viewed from the back side (a side opposite to the side on which the main screen is provided) thereof.

The mobile device according to the embodiment is mobile phone 1 having a digital camera function, that is, image capture device 2. Mobile phone 1 has first main body 3 and second main body 5 which is foldable by using hinge mechanism 4 interposed between second main body 5 and first main body 3.

In first main body 3, operation key section 6, which is constituted of numeric keys so as to input an operation of mobile phone 1, and microphone 7, which inputs telephone voice, are provided on the inside of mobile phone 1 when the phone is folded to be small in size. In first main body 3, sounder 8, which notifies an incoming call state and the like, is provided on the outside of mobile phone 1 when the phone is folded to be small in size.

In second main body 5, speaker 9, which outputs receiver voice, and first display 10, which displays characters and images, are provided on the inside of mobile phone 1 when the phone is folded to be small in size. In second main body 5, second display 11 which displays characters and images similarly to first display 10, light emitting element 12 which emits light, and optical system 13 which concentrates light (light of light emitting element 12 or light such as sunlight) reflected from the subject are provided on the outer circumferential surface of mobile phone 1 when the phone is folded to be small in size.

Figure 2B:
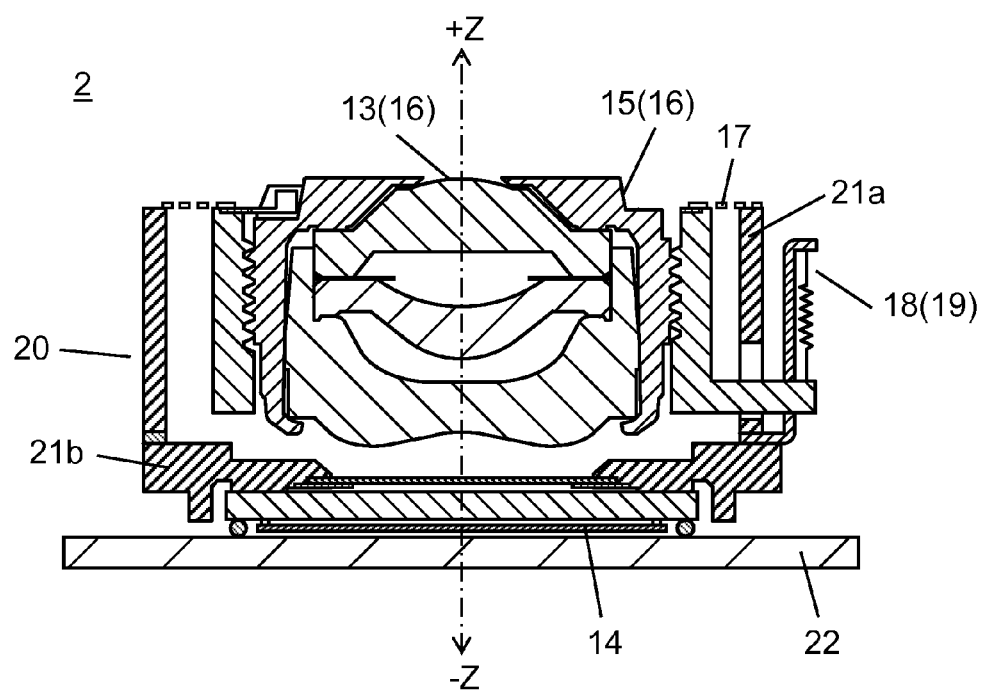
FIG. 2B is a schematic sectional view of the entire image capture device according to the embodiment of the present invention.
Figure 3:
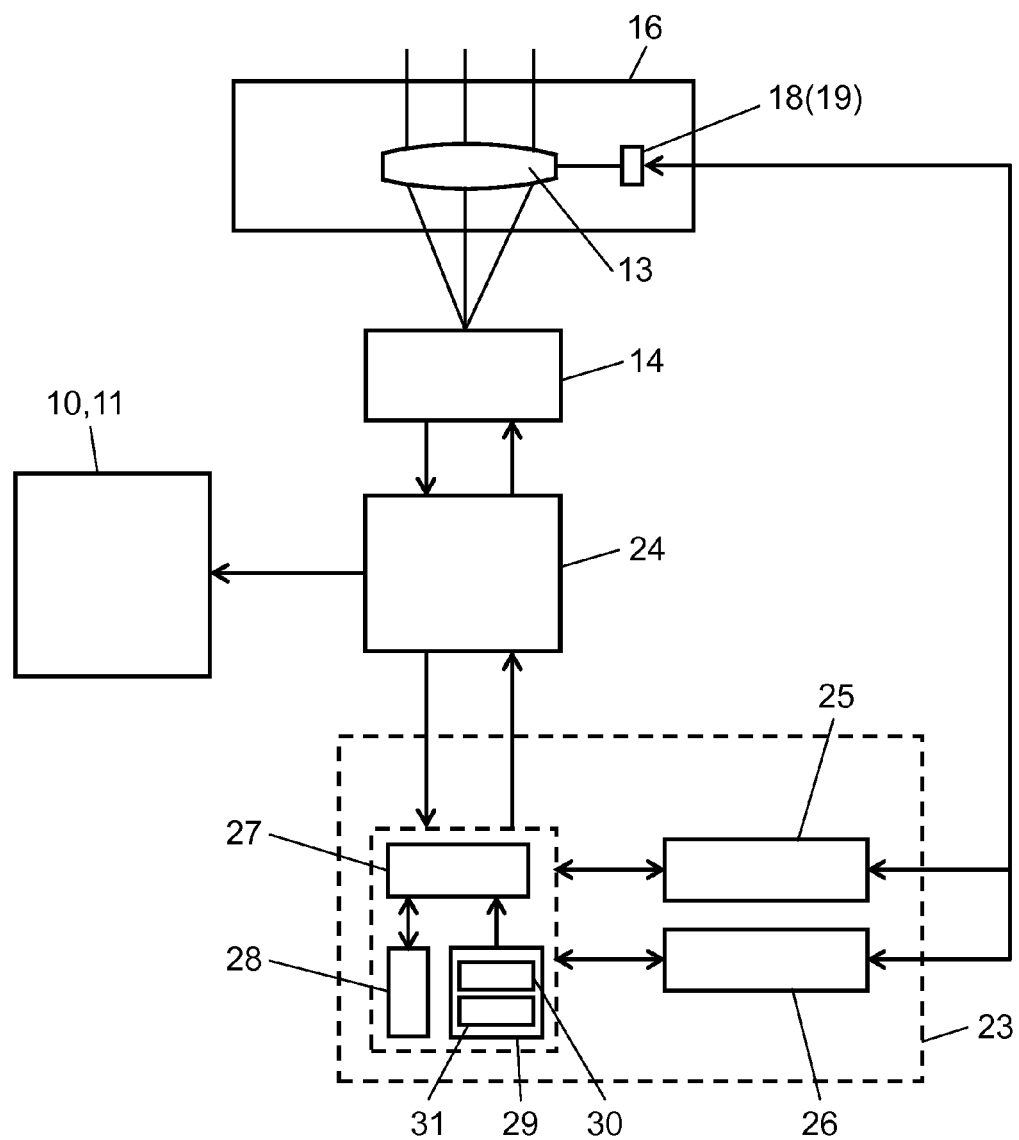
FIG. 3 is a block diagram illustrating a system configuration of the image capture device according to the embodiment of the present invention.

Next, a structure and a system configuration of image capture device 2 will be described with reference to FIGS. 2A, 2B, and 3. FIGS. 2A and 2B are overall views of image capture device 2. FIG. 2A is a top plan view of image capture device 2. FIG. 2B is a longitudinal sectional view of image capture device 2. FIG. 3 is a block diagram illustrating the system configuration of image capture device 2. Image capture device 2 includes: imaging element 14; optical system 13; driven section 16; bias spring (an urging means) 17; actuator 19; outer holder 20; substrate 22; driving section 23; first display 10; second display 11; and control section 24. Optical system 13 is constituted by one or more (three in the embodiment) lenses that form an optical image of the subject on imaging element 14. Driven section 16 has optical system 13 and a lens holder 15 that holds optical system 13. Bias spring 17 urges driven section 16 in a prescribed direction. Actuator 19 applies current so as to increase temperature, thereby moving driven section 16 in a direction opposite to the prescribed direction of the urge of bias spring 17. Actuator 19 uses shape-memory alloy (hereinafter simply abbreviated as "SMA") 18 which is able to change a resistance value so as to move driven section 16 in the prescribed direction by adjusting the applied current so as to decrease the heat amount at the time of current application and lowering the temperature. Outer holder 20 houses driven section 16 so as to be displaceable in the optical axis direction of optical system 13. Substrate 22 is a planar substrate on which annular base 21b disposed on the base end side of outer holder 20 and imaging element 14 disposed on the base end side of outer holder 20 are mounted. Driving section 23 controls driven section 16. First display 10 and second display 11 are display screens that display captured images and the like. Control section 24 is connected to imaging element 14, driving section 23, first display 10, second display 11, and the like, thereby controlling the entire image capture processing.

Imaging element 14 converts an optical image, which is formed by optical system 13, into an electric signal, and outputs the image. Imaging element 14 is, for example, a CMOS image sensor or a CCD image sensor. Control section 24 may be built into imaging element 14.

Lens holder 15 houses a plurality of (three in FIGS. 2A and 2B) lenses. An opening portion, which fulfills a function of an aperture diaphragm of the lenses, is provided on the upper portion of lens holder 15, and a male screw is formed on the outer circumferential surface of lens holder 15.

Outer holder 20 is configured to have a substantially cylindrical shape, and a female screw is formed on the inner surface thereof. The male screw of lens holder 15 is threadedly engaged on the female screw, and thus the lens, lens holder 15, outer holder 20, and frame 21a are concentrically arranged. Bias spring 17, which has opening holes provided in the center thereof, is provided on the upper surface (the subject side surface) of outer holder 20 in plan view.

Bias spring 17 is formed in a substantially rectangular parallelepiped shape, and is a plate spring that connects frame 21a with lens holder 15. That is, one end of bias spring 17 is fixed onto frame 21a, and the other end thereof is fixed onto lens holder 15. Thus, the spring urges in a direction (−Z direction in FIG. 2B) of extending SMA 18. Accordingly, bias spring 17 urges lens holder 15 in a direction of pulling the lens holder toward imaging element 14, and also urges optical system 13, which is housed in lens holder 15, toward imaging element 14 in the optical axis direction. FIG. 2B shows a state where bias spring 17 urges toward imaging element 14 with SMA 18 extended.

It is preferable that SMA 18 should be formed in a wire shape of which the diameter is 10 to 100 μm. From the viewpoint of response of autofocus, it is preferable that the diameter of SMA 18 should be about 27 to 40 μm. SMA 18 connects outer holder 20 with lens holder 15. As the temperature of SMA 18 rises, SMA 18 contracts in the lengthwise direction, and then optical system 13 is moved to the subject side (+Z direction in FIG. 2B). In contrast, the temperature of SMA 18 lowers, SMA 18 extends in the lengthwise direction, and then optical system 13 is moved toward imaging element 14 side (−Z direction in FIG. 2B) by bias spring 17. SMA 18 is designed and processed so as to reveal its memorized shape at a temperature higher than the ambient temperature range in which image capture device 2 is used. More specifically, the transformation-temperature range, in which a crystal structure changes from martensite to austenite, is set to be positioned in a temperature range higher than the ambient temperature range in which image capture device 2 is used. The attachment positions of bias spring 17 and SMA 18 is not limited to the example shown in FIG. 2B if the position of driven section 16 can be changed.

Driving section 23 includes: current applying section 25; measurement section 26; information processing section (CPU) 27; first storage section (RAM) 28; and second storage section (ROM) 29. Second storage section (ROM) 29 has driving control section 30 and signal output section 31 built therein. Current applying section 25 applies current to actuator 19 using SMA 18. Measurement section 26 measures the characteristic value of actuator 19, and for example, measures the resistance value of SMA 18 when current applying section 25 applies current. Driving control section 30 controls, in order to move driven section 16 having optical system 13 to a prescribed position, current application to current applying section 25 on the basis of the resistance value (the characteristic value of actuator 19) of SMA 18 measured by measurement section 26. When the resistance value of SMA 18 is changed from a low resistance value to a high resistance value so as to correspond to the direction of extending SMA 18 in accordance with the decrease in temperature thereof, signal output section 31 outputs a prescribed signal to driving control section 30 on the basis of the resistance value of SMA 18 which is measured by measurement section 26. Driving control section 30 changes, in response to the prescribed signal, the resistance value of SMA 18 corresponding to the position for moving the position of driven section 16 to the prescribed position. Information processing section (CPU) 27 is disposed around first storage section (RAM) 28 and second storage section (ROM) 29, and executes prescribed processing in response to the input signal. First storage section (RAM) 28 is able to store the processing result of information processing section 27. Second storage section (ROM) 29 stores a program that performs processing through information processing section 27.

The optical system drive device according to the embodiment includes optical system 13; an urging member 17; actuator 19; current applying section 25; measurement section 26; driving control section 30; and signal output section 31. In the above description, the characteristic value of actuator 19 is the resistance value of the shape-memory alloy, is not limited to this, and may be a current value or a voltage value based on the resistance value.

In the following description, as an example, current applying section 25, measurement section 26, information processing section 27, driving control section 30, and signal output section 31 are parts different from control section 24. However, the invention is not limited to this description, and current applying section 25, measurement section 26, information processing section 27, driving control section 30, and signal output section 31 may have control section 24 as one function.

Current applying section 25 is connected to SMA 18, information processing section 27, first storage section 28, and second storage section 29, and has a power source circuit which adjusts and supplies the applied current in order to heat up and cools down SMA 18. Current applying section 25 adjusts and supplies the applied current to SMA 18 on the basis of the input of the current application start signal for starting the heating or the cooling of SMA 18 from driving control section 30. Specifically, current applying section 25 adjusts and supplies the applied current to SMA 18 so as to decrease the heat amount thereof on the basis of the input of the current application start signal for starting the cooling of SMA 18 from driving control section 30. In addition, the current applying section adjusts and supplies the applied current to SMA 18 so as to increase the heat amount thereof on the basis of the input of the current application start signal for starting the heating of SMA 18 from driving control section 30.

Measurement section 26 is connected to SMA 18 and driving control section 30, and has a resistance measurement circuit which measures the resistance value of SMA 18. Measurement section 26 transmits the measured resistance value of SMA 18 to driving control section 30.

Driving control section 30 and signal output section 31 is connected to control section 24 which controls autofocus, current applying section 25 that adjusts and supplies the applied current to SMA 18, and measurement section 26 that measures the resistance value of SMA 18.

Information processing section 27 performs processing of the program recorded in second storage section 29. In order to perform calibration control, move the position of the optical system, and hold the position of the optical system, second storage section 29 stores a driving control program (hereinafter, the driving control program is represented by the reference numeral 30 which is the same as that of the driving control section) for controlling current applying section 25 and measurement section 26, and a signal output program (hereinafter, the signal output program is represented by the reference numeral 31 which is the same as that of the signal output section) for outputting the current application start signal, which is for starting the current application to SMA 18, to current applying section 25. Signal output section 31 is not limited to the program, and may be stored in a portion outside second storage section 29. The signal output may be directly performed on control section 24.

Driving control program 30 and signal output program 31 are read out by information processing section 27 on the basis of the command from control section 24 when performing the calibration control, moving the position of the optical system, and holding the position of the optical system.

Control section 24 performs control of entire image capture device 2 including control of camera activation and autofocus, and for example, performs processing such as processing of displaying the taken picture data on first display 10.

Figure 4A:
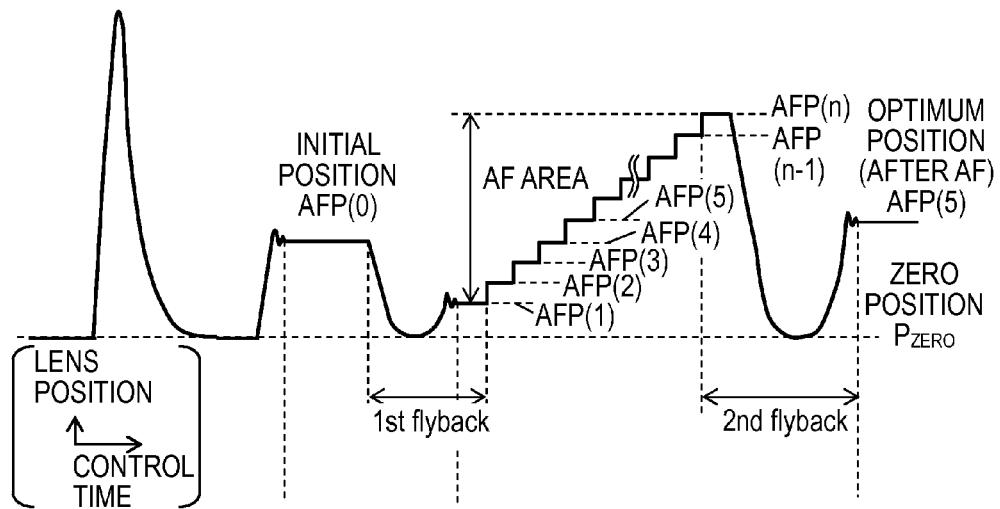
FIG. 4A is a diagram schematically illustrating change in a position of a driven section caused by passage of a control time for a conventional image capture device.
Figure 4B:
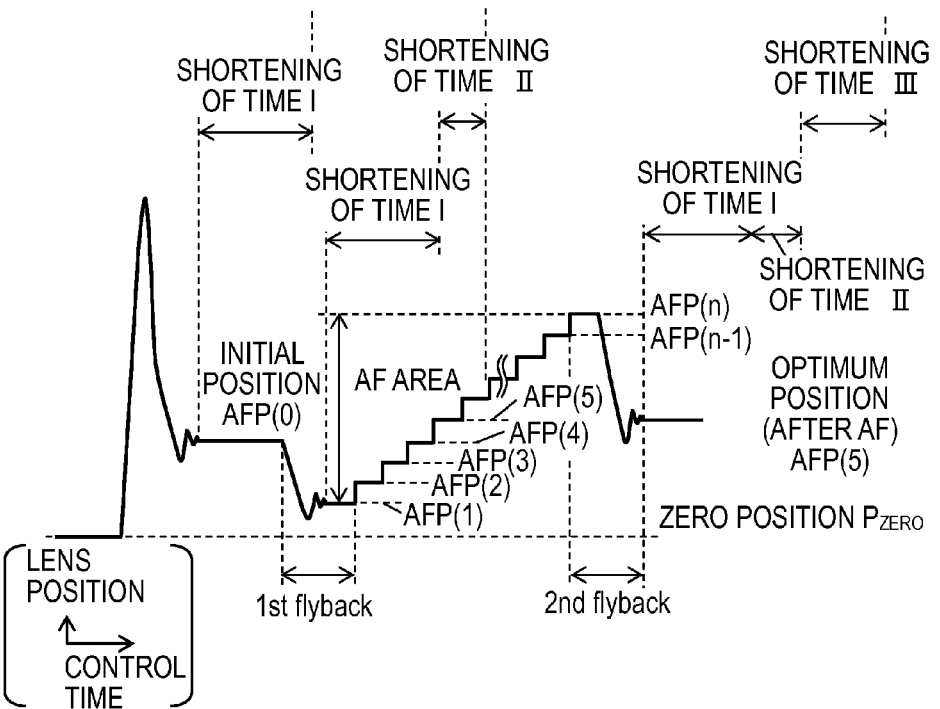
FIG. 4B is a diagram schematically illustrating change in a position of a driven section caused by passage of a control time for the image capture device according to the embodiment of the present invention.

Next, the autofocus operation of image capture device 2 according to the embodiment will be described in detail with reference to FIGS. 3, 4A, and 4B. FIGS. 4A and 4B are diagrams schematically illustrating changes in the position of the optical system in the driven section, the changes being caused by passage of control time for the image capture device. FIG. 4A is a diagram of a case where the conventional image capture device is used, and FIG. 4B is a diagram of a case where the image capture device according to the embodiment is used.

When the command for executing the calibration control before the autofocus is issued from control section 24 to driving control section 30, driving control section 30 issues a command of the current application start signal for starting the heating of SMA 18 to current applying section 25 so as to be able to perform the calibration control. Next, in response to receiving the signal, current applying section 25 starts the adjustment and supply of the applied current for heating SMA 18, and simultaneously, measurement section 26 measures the resistance value of SMA 18, and outputs driving control section 30.

In the calibration control, the resistance range from the maximum resistance value at which the resistance value of SMA 18 is maximized and to the minimum resistance value at which the resistance value thereof is minimized is measured. That is, driving control section 30 adjusts and supplies the applied current for heating SMA 18 to current applying section 25 so as to move (change in a direction of shortening the length of SMA 18) the position of the optical system of driven section 16 from ZERO position $P_{ZERO}$ (ZERO position $P_{ZERO}$ is a position which is at a further infinite (over-infinite) distance from the infinite position, and the infinite position is set as an effective operation area) to the subject side. Measurement section 26 measures the resistance range of SMA 18 therebetween, and derives the maximum and minimum resistance values of SMA 18 from the measurement result. The resistance range of SMA between the maximum and minimum resistance values is associated with the movable range of the optical system of driven section 16, that is, the focal length from imaging element 14 side to the subject side in the optical axis direction of optical system 13. For example, the minimum resistance value may be associated with the marginal position of the optical system on the subject side farthest from imaging element 14, and the maximum resistance value may be associated with the marginal position of the optical system on imaging element 14 side closest to imaging element 14. The resistance range described herein is not a limit range of the resistance value corresponding to the physically movable position of the optical system in driven section 16, but a limit range in which the optical system in driven section 16 can be controlled in the optical axis direction.

After the calibration control of the optical system of driven section 16, before the autofocus control for acquiring photographing data of each field, the command for moving the optical system of driven section 16 to initial position AFP(0), at which the optical system is held, is issued from control section 24 to driving control section 30. Then, the applied current for lowering the temperature is adjusted and supplied from current applying section 25 to SMA 18. Thereby, in order to move the optical system of driven section 16 to initial position AFP(0) at which the optical system is held, the resistance value of SMA 18 changes (changes in a direction of extending the length of SMA 18) from the minimum resistance value to the maximum resistance value. When the resistance value of SMA 18 measured by measurement section 26 reaches a value corresponding to initial position AFP(0), by outputting a first stop signal from signal output section 31, the optical system of driven section 16 is moved and held to change the resistance value of SMA 18 to initial position AFP(0).

Subsequently, after the optical system of driven section 16 is held by setting the resistance value of SMA 18 to initial position AFP(0), the command for moving the optical system of driven section 16 to first position AFP(1) of the optical system, at which the optical system is held, is issued from control section 24 to driving control section 30 so as to perform the autofocus control. Then, the applied current for lowering the temperature is adjusted and supplied from current applying section 25 to SMA 18. Thereby, in order to move the optical system of driven section 16 to first position AFP(1) of the optical system for the autofocus control at which the optical system of driven section 16 is held, the resistance value of SMA 18 changes (changes in a direction of extending the length of SMA 18) to increase. When the resistance value of SMA 18 measured by measurement section 26 reaches the value corresponding to first position AFP(1) of the optical system, a second stop signal is output from driving control section 30. In response to the control signal, the optical system of driven section 16 is moved and held to change the resistance value of SMA 18 to first position AFP(1) of the optical system.

Subsequently, in the autofocus control, when the command is issued from control section 24 to driving control section 30 so as to perform the autofocus control, current applying section 25 supplies the applied current which is controlled to heat SMA 18. Thereby, the deformation amount of actuator 19 is controlled, and specifically, the deformation amount is changed in the direction of shortening the length of SMA 18. Then, the optical system of driven section 16 is moved in a direction from imaging element 14 side to the subject side. In the embodiment, n fields are provided in the focus area, that is, there are n positions of driven section 16 at which driven section 16 stops.

The optical system of driven section 16 sequentially moves from first position AFP(1) of the optical system corresponding to the field of imaging element 14 side in the moving region corresponding to the focus area of image capture device 2. That is, the optical system of driven section 16 moves in a stepwise fashion while stopping during a predetermined time at each position AFP(x) (x=1, 2, 3, . . . , n) of driven section 16 corresponding to each field in the focus area.

At this time, control section 24 stores focus estimation values on the basis of the image capturing data which is acquired for each field (for each lens position AFP(x) (x=1, 2, 3, . . . , n)) in the focus area. As shown in FIGS. 4A and 4B, by checking the lens position (AFP(6) in the embodiment) at which control section 24 decreases the focus estimation value, lens position AFP(5), which is right before start of the decrease in the focus estimation value, is determined as a target position, and the lens is moved to and stopped at target position AFP(5).

However, after calibration control, when driven section 16 is moved to initial position AFP(0), in the case of the conventional image capture device, as shown in FIG. 4A, the optical system of driven section 16 is temporarily moved toward imaging element 14 from the subject side up to ZERO position $P_{ZERO}$ by controlling actuator 19, and is then moved to initial position AFP(0). That is, driving control section 30 issues a command, which is for shutting off the current application to SMA 18 so as to increase the resistance value from the minimum resistance value after the calibration control toward a high resistance value, to current applying section 25. Then, the resistance value is increased up to the resistance value of SMA 18 at which the lens position corresponds to ZERO position $P_{ZERO}$ in measurement section 26. Driving control section 30 reissues the command, which is for applying current to SMA 18, to current applying section 25, thereby applying current to SMA 18 until measurement section 26 measures the initial resistance value of SMA 18 corresponding to initial position AFP(0).

On the other hand, in the case of image capture device 2 according to the embodiment, as shown in FIG. 4B, the optical system of driven section 16 can be moved to initial position AFP(0) without being moved toward imaging element 14 from the subject side up to ZERO position $P_{ZERO}$ by controlling actuator 19. That is, driving control section 30 issues a command, which is for adjusting and supplying the applied current to SMA 18 so as to increase the resistance value of SMA 18 after the calibration control, to current applying section 25. Specifically, when the resistance value of SMA 18 is being change from the minimum resistance value toward the maximum resistance value, on the basis of the resistance value of SMA 18 measured by measurement section 26, the resistance value exceeds the initial resistance value at least once, and the resistance value is lowered by adjusting and supplying the applied current to SMA 18 again, whereby signal output section 31 outputs the first stop signal so as to change the resistance value as the characteristic value of SMA 18 to the initial resistance value corresponding to initial position AFP(0).

As the first stop signal, the ACK (Acknowledge) based on I2C, the acquired resistance value, or a value varying variable with that is considered.

In the description of driving control section 30, signal output section 31 outputs the first stop signal at the initial resistance value (or a resistance value lower by a predetermined resistance value than the initial resistance value). However, the invention is not limited to this, and driving control section 30 may output a signal, which is for adjusting and supplying the applied current to current applying section 25, after a predetermined period from the time at which the first stop signal is received. Signal output section 31 outputs the first stop signal at a resistance value higher by the predetermined resistance value than the initial resistance value, control section 24 may output a signal, which is for applying the current to current applying section 25, to driving control section 30 when receiving the first stop signal. When receiving the first stop signal from the signal control section 28, driving control section 30 may adjust and supply the applied current to SMA 18 by issuing the command, which is for applying the current to SMA 18, to current applying section 25 until measurement section 26 measures the initial resistance value.

Subsequently, a description will be given of a case where, before the autofocus control, the optical system of driven section 16 is moved to first field position AFP(1), which corresponds to the first position of the optical system of driven section 16 in the autofocus control, in the focus area. In the case of the conventional image capture device, as shown in FIG. 4A, the optical system of driven section 16 is temporarily moved toward imaging element 14 side from the subject side up to ZERO position $P_{ZERO}$ by controlling actuator 19, and is then moved to first field position AFP(1). That is, driving control section 30 issues a command, which is for shutting off the current application to SMA 18, to current applying section 25 so as to increase the resistance value from the initial resistance value before the autofocus control toward a high resistance value. Then, the resistance value is increased up to the resistance value of SMA 18 at which the lens position corresponds to ZERO position $P_{ZERO}$ in measurement section 26. Driving control section 30 reissues the command, which is for applying current to SMA 18, to current applying section 25, thereby applying current to SMA 18 until measurement section 26 measures the first resistance value of SMA 18 corresponding to first field position AFP(1).

On the other hand, in the case of image capture device 2 according to the embodiment, as shown in FIG. 4B, the optical system of driven section 16 can be moved to first (initial) field position AFP(1) without being moved toward imaging element 14 from the subject side up to ZERO position $P_{ZERO}$ by controlling actuator 19. That is, driving control section 30 issues a command, which is for adjusting and supplying the applied current to SMA 18 so as to increase the resistance value from the initial resistance value before the autofocus control, to current applying section 25. Specifically, when the resistance value of SMA 18 is being change from the initial resistance value toward a resistance value higher than initial resistance value, on the basis of the resistance value of SMA 18 measured by measurement section 26, the signal control section 28 makes the resistance value exceed the first resistance value at least once. Thereafter, the signal control section 28 lowers the resistance value by adjusting and supplying the applied current to SMA 18 again, thereby outputting the second stop signal so as to change the resistance value as the characteristic value of SMA 18 to the first resistance value corresponding to first position AFP(1) of the optical system.

In the description of driving control section 30, signal output section 31 outputs the second stop signal at the first resistance value (or a resistance value lower by a predetermined resistance value than the first resistance value). However, the invention is not limited to this, and driving control section 30 may output a signal, which is for adjusting and supplying the applied current to current applying section 25, after a predetermined period from the time at which the second stop signal is received. The signal output section 31 outputs the second stop signal at a resistance value higher by the predetermined resistance value than the first resistance value, driving control section 30 may output a signal, which is for applying the current to driving control section 30, when receiving the second stop signal. When receiving the second stop signal from the signal control section 28, driving control section 30 may adjust and supply the applied current to SMA 18 by issuing the command, which is for applying the current to SMA 18, to current applying section 25 until measurement section 26 measures the first resistance value.

Subsequently, a description will be given of a case where, after the autofocus control, the optical system of driven section 16 is moved to optimum field position AFP(5), which corresponds to the optimum position of the optical system of driven section 16 measured by the autofocus control, in the focus area. In the case of the conventional image capture device, as shown in FIG. 4A, the optical system of driven section 16 is temporarily moved toward imaging element 14 side from the subject side up to ZERO position $P_{ZERO}$ by controlling actuator 19, and is then moved to optimum field position AFP(5). That is, driving control section 30 issues a command, which is for shutting off the current application to SMA 18, to current applying section 25 so as to increase the resistance value from the final resistance value, which corresponds to the final position of the optical system of driven section 16 in the autofocus control, after the autofocus control toward a high resistance value. Then, the resistance value is increased up to the resistance value of SMA 18 at which the optical system position corresponds to ZERO position $P_{ZERO}$ in measurement section 26. Driving control section 30 reissues the command, which is for applying current to SMA 18, to current applying section 25, thereby applying current to SMA 18 until resistance measurement section 26 measures the optimum resistance value of SMA 18 corresponding to optimum field position AFP(5).

On the other hand, in the case of image capture device 2 according to the embodiment, as shown in FIG. 4B, the optical system of driven section 16 can be moved to optimum field position AFP(5) without being moved toward imaging element 14 from the subject side up to ZERO position $P_{ZERO}$ by controlling actuator 19. That is, driving control section 30 issues a command, which is for adjusting and supplying the applied current to SMA 18 so as to increase the resistance value from the final resistance value before the autofocus control, to current applying section 25. Specifically, when the resistance value of SMA 18 is being change from the final resistance value toward a resistance value higher than the final resistance, on the basis of the resistance value of SMA 18 measured by measurement section 26, the resistance value exceeds the optimum resistance value at least once, and the resistance value is lowered by adjusting and supplying the applied current to SMA 18 again, whereby signal output section 31 outputs the third stop signal so as to change the resistance value to the optimum resistance value.

In the description of driving control section 30, signal output section 31 outputs the third stop signal at the optimum resistance value (or a resistance value lower by a predetermined resistance value than the optimum resistance value). However, the invention is not limited to this, and driving control section 30 may output a signal, which is for adjusting and supplying the applied current to current applying section 25, after a predetermined period from the time at which the third stop signal is received. Signal output section 31 outputs the third stop signal at a resistance value higher by the predetermined resistance value than the optimum resistance value, and thereafter may output a signal, which is for applying the current to current applying section 25, when receiving the third stop signal. When receiving the third stop signal from signal output section 31, driving control section 30 may adjust and supply the applied current to SMA 18 by issuing the command, which is for applying the current to SMA 18, to current applying section 25 until measurement section 26 measures the optimum resistance value.

As described above, when the position of the optical system of driven section 16 is intended to be changed to the prescribed position, the optical system of driven section 16 may be located to be closer to the subject side than the prescribed position by applying current to SMA 18. In this case, driving control section 30 adjusts and supplies current to SMA 18 so as to be able to increase the resistance value of SMA 18. That is, since SMA 18 extends in the lengthwise direction by lowering the temperature thereof, the optical system of driven section 16 may be controlled to be moved to imaging element 14 side by actuator 19. Signal output section 31 outputs the prescribed signal to driving control section 30 when the resistance value of SMA 18 measured by measurement section 26 reaches the resistance value corresponding to the position for movement to the prescribed position. That is, driving control section 30 controls, on the base of prescribed signal, the optical system of driven section 16 so as to move the optical system to the prescribed position.

In the conventional image capture device, by lowering the temperature of SMA 18, the optical system of driven section 16 is moved toward imaging element 14 side up to ZERO position $P_{ZERO}$, and is moved to the prescribed position on the subject side by applying current to SMA 18 again. That is, in the conventional image capture device, similarly to image capture device 2 of the present invention, by using the resistance value of SMA 18 measured by the measurement section 26, the prescribed signal is output, and the position control for direct movement to the prescribed position is not performed. Accordingly, in the conventional image capture device, it takes unnecessary time to pass ZERO position $P_{ZERO}$. In image capture device 2 of the present invention, as compared with the conventional image capture device, by shortening such time, it is possible to shorten the whole time for moving the optical system of driven section 16 to the prescribed position.

In response to receiving the prescribed signal from the signal output section 31, the resistance value of SMA 18 exceeds the resistance value of SMA 18 corresponding to the prescribed position once, and decreases, and thereafter increases toward the resistance value of SMA 18 corresponding to the prescribed position again, and can be controlled to change to the resistance value of SMA 18 corresponding to the prescribed position. By performing control in such a manner, it is possible to reduce the effect of hysteresis existing in SMA 18.

With such a configuration, driving control section 30 is able to change the position of optical system 13, and thus the positions of imaging element 14 and optical system 13 can be controlled.

More specifically, signal output section 31 outputs the first stop signal to driving control section 30 when the resistance value of SMA 18 measured by resistance measurement section 26 reaches the initial resistance value. Driving control section 30 controls, on the basis of the first stop signal, the optical system of driven section 16 so as to move the optical system to initial position AFP(0).

In the conventional image capture device, after the calibration control, by lowering the temperature of SMA 18, the optical system of driven section 16 is moved toward imaging element 14 side up to ZERO position $P_{ZERO}$, and is moved to initial position AFP(0) on the subject side by applying current to SMA 18 again. That is, in the conventional image capture device, similarly to image capture device 2 of the present invention, by using the resistance value of SMA 18 measured by the measurement section 26, the first stop signal is output, and the position control for direct movement to initial position AFP(0) is not performed. Accordingly, in the conventional image capture device, it takes unnecessary time to pass ZERO position $P_{ZERO}$. In image capture device 2 of the present invention, as compared with the conventional image capture device, by shortening such time (shortening time I), it is possible to shorten the time for moving the optical system of driven section 16 to initial position AFP(0).

The signal output section 31 outputs the second stop signal to driving control section 30 when the resistance value of SMA 18 measured by measurement section 26 reaches the first resistance value. The driving control section 30 controls, on the basis of the second stop signal, the optical system of driven section 16 so as to move the optical system of driven section 16 to the position of the optical system for the autofocus control.

In the conventional image capture device, before the autofocus control, by lowering the temperature of SMA 18, the optical system of driven section 16 is moved toward imaging element 14 side up to ZERO position $P_{ZERO}$, and is moved to the first (initial) position of the optical system on the subject side by applying current to SMA 18 again. That is, in the conventional image capture device, similarly to image capture device 2 of the present invention, by using the resistance value of SMA 18 measured by the measurement section 26, the second stop signal is output, and the position control for direct movement to the first position of the optical system is not performed. Accordingly, in the conventional image capture device, it takes unnecessary time to pass ZERO position $P_{ZERO}$. In image capture device 2 of the present invention, as compared with the conventional image capture device, by shortening such time (shortening time II), it is possible to shorten the time for moving the optical system of driven section 16 to the first position of the optical system.

When the resistance value of SMA 18 measured by measurement section 26 reaches the optimum resistance value, the signal output section 31 outputs the third stop signal so as to change the optimum resistance value, which corresponds to the optimum position of the optical system, to the resistance value as the characteristic value of SMA 18. The driving control section 30 controls, on the basis of the third stop signal, the optical system of driven section 16 so as to move the optical system of driven section 16 to the optimum position of the optical system.

In the conventional image capture device, after the autofocus control, by lowering the temperature of SMA 18, the optical system of driven section 16 is moved toward imaging element 14 side up to ZERO position $P_{ZERO}$, and is moved to the optimum position on the subject side by applying current to SMA 18 again. That is, in the conventional image capture device, similarly to image capture device 2 of the present invention, by using the resistance value of SMA 18 measured by the measurement section 26, the third stop signal is output, and the position control for direct movement to the optimum position of the optical system is not performed. Accordingly, in the conventional image capture device, it takes unnecessary time to pass ZERO position $P_{ZERO}$. In image capture device 2 of the present invention, as compared with the conventional image capture device, by shortening such time (shortening time III), it is possible to shorten the time for moving the optical system of driven section 16 to the optimum position of the optical system.

Since SMA 18 has a wire shape of which the diameter is 10 to 100 μm, it is possible to easily dissipate the heat of SMA 18, and thus it is possible to increase the cooling rate of SMA 18. As a result, the response of the autofocus becomes better.

The image capture device according to the present invention is not limited to the embodiment, and it is apparent that various modifications may be made without departing from the technical scope of the present invention.

The image capture device 2 according to the embodiment was described through the example in which, in response to receiving the prescribed signal from the signal output section 31, the resistance value of SMA 18 exceeds the resistance value of SMA 18 corresponding to the prescribed position once, and decreases, and thereafter increases toward the resistance value of SMA 18 corresponding to the prescribed position again, and is controlled to change to the resistance value of SMA 18 corresponding to the prescribed position. However, the invention is not limited to this. In a case where the effect of hysteresis existing in the shape-memory alloy is not considered, in response to receiving the prescribed signal from the signal output section, the resistance value of the shape-memory alloy may be controlled to change to the resistance value of the shape-memory alloy corresponding to the prescribed position.

The image capture device 2 according to the embodiment was described through the example which is applied in the case where, in order to acquire the photographing data of each field in the focus area, the position of the optical system of driven section 16 is moved from initial position AFP(0) before the autofocus control for moving the optical system in a stepwise fashion to first field position AFP(1), and in the case where the optical system is moved from final field position AFP(n) after the autofocus control to optimum field position AFP(4). The invention is not limited to this. For example, in order to acquire the photographing data of each field in the focus area, after the first autofocus control for moving the lens position of the driven section 16 in a stepwise fashion, the autofocus control, which is performed in the second step of the second autofocus control for moving the position of the optical system of driven section 16 in a stepwise fashion so as to more minutely adjust the optimum field position, may be applied when the optical system is moved from the final field position of the first autofocus control to the optimum field position through the first autofocus control.

Image capture device 2 according to the embodiment was described through the example in which SMA 18 is cooled down by the natural dissipation method, but the invention is not limited to this. In the image capture device, there may be further provided a cooling mechanism for cooling the shape-memory alloy, and the shape-memory alloy may be forcedly cooled down. For example, the cooling mechanism may be an air-cooling type or a water cooling type, and may be a Peltier element. In such a manner, by forcedly cooling down the shape-memory alloy through the cooling mechanism, it is possible to increase the cooling rate of the shape-memory alloy.

As described above, an optical system drive device of the present invention includes: an optical system movable in a moving range; an urging member urging the optical system in an optical axis direction; a shape-memory alloy actuator for moving the optical system in the optical axis direction; a current applying section for supplying a current to the actuator; and a measurement section for measuring a characteristic value of the actuator; a driving control section for controlling the supply current to the current applying section according to the characteristic value measured by the measurement section; and a signal output section for outputting a prescribed signal to the driving control section when the characteristic value of the actuators measured by the measurement section reaches a value corresponding to the target position of the optical system while making the shape-memory alloy of the actuator change the length at least in an extending direction mode when moving the optical system to the target position.

With such a configuration, when the optical system is moved to the target position, the driving control section controls the applied current so as to reduce the heat applied to the shape-memory alloy. Thereby, the temperature of the shape-memory alloy is lowered and the shape-memory alloy is changed the length in an extending direction mode, and then the optical system is moved toward the prescribed direction. When the characteristic value of the shape-memory alloy measured by the measurement section reaches the value corresponding to the target position, by outputting the prescribed signal to the driving control section through the signal output section, the optical system can be moved to the target position. As a result, when the optical system is moved to the target position, in practice, the shape-memory alloy is naturally cooled down. In the prior art, the optical system is moved to the target position through the ZERO position, and thus the time for moving the optical system to the target position increases. In contrast, in the present invention, the optical system can be moved to the target position without passing the ZERO position, and thus it is possible to shorten the time for moving the optical system to the target position.

In the optical system drive device of the present invention, the signal output section outputs a prescribed signal to make the characteristic value of the actuator changed to the value corresponding to the target position after the characteristic value of the actuator exceeds the value corresponding to the target position at least once when the optical system is moved to the target position according to the characteristic value of the actuator measured by the measurement section.

With such a configuration, in response to receiving the prescribed signal from the signal output section, the characteristic value of the actuator, for example, the resistance value of the shape-memory alloy exceeds the resistance value of the shape-memory alloy corresponding to the target position of the optical system once, and decreases, and thereafter increases toward the resistance value of the shape-memory alloy corresponding to the prescribed position again, and the driving control section controls the resistance value so as to change to the resistance value of shape-memory alloy corresponding to the target position. By performing control in such a manner, it is possible to reduce the effect of hysteresis existing in the shape-memory alloy.

The image capture device of the present invention includes the optical system drive device; and the imaging element for capturing an image formed via the optical system of the optical system drive device.

With such a configuration, it is possible to change the position of the optical system through the driving control section with the configuration, and thus it is possible to control the positions of the imaging element and the optical system.

In the image capture device of the present invention, the signal output section outputs a first stop signal to the driving control section when the characteristic value of the actuator measured by the measurement section reaches a value corresponding to an initial position where the optical system is to be held while making the shape-memory alloy change the length in the extending mode, after completion of calibration control for setting the characteristic value in relation to a movable range of the optical system from a minimum position to a maximum position along the optical axis, before initiating autofocus control for moving the position of the optical system in a stepwise fashion according to the characteristic value of the actuator.

With such a configuration, the signal output section outputs the first stop signal to the driving control section when the characteristic value of the actuator for example the resistance value of the shape-memory alloy measured by the measurement section reaches a value corresponding to the initial position or the position for moving the position of the optical system to the initial position. The driving control section controls, on the basis of the first stop signal, the position of the optical system to move the optical system to the initial position.

In the conventional image capture device, after the calibration control, by lowering the temperature of the shape-memory alloy, the optical system is moved up to the ZERO position in the prescribed direction, and is moved up to the initial position in the direction opposite to the prescribed direction by applying current to the shape-memory alloy again. That is, in the conventional image capture device, similarly to the image capture device of the present invention, by using the resistance value of the shape-memory alloy measured by the measurement section, the first stop signal is output, and the position control for direct movement to the initial position is not performed. Accordingly, in the conventional image capture device, it takes unnecessary time to pass the ZERO position. In the image capture device of the present invention, as compared with the conventional image capture device, by shortening such time, it is possible to shorten the time for moving the driven section to the initial position.

In the image capture device of the present invention, the signal output section outputs a second stop signal to the driving control section when the characteristic value reaches a value corresponding to a first position of the optical system in the autofocus control according to the characteristic value of the actuator measured by the measurement section while making the shape-memory alloy change the length in the extending mode after moving the optical system to the initial position.

With such a configuration, the signal output section outputs the second stop signal to the driving control section when the characteristic value of the actuator for example the resistance value of the shape-memory alloy measured by the measurement section reaches a resistance value of the shape-memory alloy corresponding to the first position of the optical system for the autofocus control or a position for moving the position of the optical system to the first position of the optical system for the autofocus control. The driving control section controls, on the basis of the second stop signal, the optical system to move the optical system to the first position of the driven section for the autofocus control.

In the conventional image capture device, before the autofocus control, by lowering the temperature of the shape-memory alloy, the optical system is moved up to the ZERO position in the prescribed direction, and is moved up to the first position of the optical system for the autofocus control in the direction opposite to the prescribed direction by applying current to the shape-memory alloy again. That is, in the conventional image capture device, similarly to the image capture device of the present invention, by using the resistance value of the shape-memory alloy measured by the measurement section, the second stop signal is output, and the position control for direct movement to the first position of the optical system for the autofocus control is not performed. Accordingly, in the conventional image capture device, it takes unnecessary time to pass the ZERO position. In the image capture device of the present invention, as compared with the conventional image capture device, by shortening such time, it is possible to shorten the time for moving the optical system to the first position of the optical system for the autofocus control.

In the image capture device of the present invention, the signal output section outputs a third stop signal to the driving control section when the characteristic value reaches a value corresponding to an optimum position of the optical system in the autofocus control according to the characteristic value of the actuator measured by the measurement section while making the shape-memory alloy change the length in the extending mode after completion of the autofocus control.

With such a configuration, the signal output section outputs the third stop signal to the driving control section when the characteristic value of the actuator for example the resistance value of the shape-memory alloy measured by the measurement section reaches a resistance value of the shape-memory alloy corresponding to the optimum position of the optical system or a position for moving the position of the optical system to the optimum position of the optical system. The driving control section controls, on the basis of the third stop signal, the optical system to move the optical system to the optimum position of the optical system.

In the conventional image capture device, after the autofocus control, by lowering the temperature of the shape-memory alloy, the optical system is moved up to the ZERO position in the prescribed direction, and is moved up to the optimum position of the optical system in the direction opposite to the prescribed direction by applying current to the shape-memory alloy again. That is, in the conventional image capture device, similarly to the image capture device of the present invention, by using the resistance value of the shape-memory alloy measured by the measurement section, the third stop signal is output, and the position control for direct movement to the optimum position of the optical system is not performed. Accordingly, in the conventional image capture device, it takes unnecessary time to pass the ZERO position. In the image capture device of the present invention, as compared with the conventional image capture device, by shortening such time, it is possible to shorten the time for moving the optical system to the optimum position of the optical system.

The image capture device of the present invention may further include the cooling mechanism for cooling the shape-memory alloy.

With such a configuration, it is possible to forcedly cool down the shape-memory alloy through the cooling mechanism, and thus it is possible to increase the cooling rate of the shape-memory alloy.

In the image capture device of the present invention, the shape-memory alloy may have a wire shape of which the diameter is 10 to 100 μm.

With such a configuration, it is possible to easily dissipate the heat of the shape-memory alloy, and thus it is possible to increase the cooling rate of the shape-memory alloy.

A mobile device of the present invention has the image capture device mounted thereon.

With such a configuration, it is possible to obtain the same effect even in the mobile device.

INDUSTRIAL APPLICABILITY

The optical system drive device according to the present invention, the image capture device provided with the optical system drive device and the mobile device mounted with the image capture device can also be applied, as compared with the conventional image capture device, to optical system drive devices, image capture devices having the optical system drive devices and, the mobile devices such as a digital camera, a mobile phone having a camera function, and a portable information terminal (PDA) mounted with the image capture devices necessary to shorten the time for moving the optical system of the driven section to the prescribed position.

REFERENCE MARKS IN THE DRAWINGS

1: MOBILE PHONE
2: IMAGE CAPTURE DEVICE
3: FIRST MAIN BODY
4: HINGE MECHANISM
5: SECOND MAIN BODY
6: OPERATION KEY SECTION
7: MICROPHONE
8: SOUNDER
9: SPEAKER
10: FIRST DISPLAY
11: SECOND DISPLAY
12: LIGHT EMITTING ELEMENT
13: OPTICAL SYSTEM
14: IMAGING ELEMENT
15: LENS HOLDER
16: DRIVEN SECTION
17: BIAS SPRING (URGING MEANS)
18: SMA (SHAPE-MEMORY ALLOY)
19: ACTUATOR
20: OUTER HOLDER
21a: FRAME
21b: BASE
22: SUBSTRATE
23: DRIVING SECTION
24: CONTROL SECTION
25: CURRENT APPLYING SECTION
26: RESISTANCE MEASUREMENT SECTION (MEASUREMENT SECTION)
27: INFORMATION PROCESSING SECTION (CPU)
28: FIRST STORAGE SECTION (RAM) (SIGNAL CONTROL SECTION)
29: SECOND STORAGE SECTION (ROM)
30: DRIVING CONTROL SECTION
31: SIGNAL OUTPUT SECTION

The invention claimed is:

1. An optical system drive device comprising:
an optical system movable in a moving range;
an urging member urging the optical system in an optical axis direction;
a shape-memory alloy actuator for moving the optical system in the optical axis direction;
a current applying section for supplying a current to the actuator;
a measurement section for measuring a characteristic value of the actuator;
a driving control section for controlling the supply current to the current applying section according to the characteristic value measured by the measurement section; and
a signal output section for outputting a prescribed signal to the driving control section when the characteristic value of the actuator measured by the measurement section reaches a value corresponding to a target position of the optical system while making the shape-memory alloy of the actuator change the length at least in an extending mode when moving the optical system to the target position,
wherein the signal output section outputs a second stop signal to the driving control section when the characteristic value reaches a value corresponding to a first position of the optical system in an autofocus control according to the characteristic value of the actuator measured by the measurement section while making the characteristic value changed from one corresponding to an initial position where the optical system is held before the autofocus control for moving a position of the optical system in a stepwise fashion to another of the extending mode in the length of the shape-memory alloy.

2. The optical system drive device of claim 1, wherein the signal output section outputs a prescribed signal to make the characteristic value of the actuator changed to the value corresponding to the target position after the characteristic value of the actuator exceeds the value corresponding to the target position at least once when the optical system is moved to the target position according to the characteristic value of the actuator measured by the measurement section.

3. An image capture device comprising:
the optical system drive device of claim 2; and
an imaging element for capturing an image formed via the optical system of the optical system drive device.

4. The image capture device of claim 3, further comprising a cooling mechanism for cooling the shape-memory alloy.

5. The image capture device of claim 3, wherein the shape-memory alloy has a wire shape of which a diameter is 10 to 100 μm.

6. The optical system drive device of claim 1,
wherein the signal output section outputs a first stop signal to the driving control section when the characteristic value of the actuator measured by the measurement section reaches a value corresponding to an initial position where the optical system is to be held while making the shape-memory alloy change the length in the extending mode, after completion of calibration control for setting the characteristic value in relation to a movable range of the optical system from a minimum position to a maximum position along the optical axis, before initiating autofocus control for moving the position of the optical system in a stepwise fashion according to the characteristic value of the actuator.

7. An image capture device comprising:
the optical system drive device of claim 6; and an imaging element for capturing an image formed via the optical system of the optical system drive device.

8. The image capture device of claim 7, further comprising a cooling mechanism for cooling the shape-memory alloy.

9. The image capture device of claim 7, wherein the shape-memory alloy has a wire shape of which a diameter is 10 to 100 μm.

10. The optical system drive device of claim 1, wherein the signal output section outputs a third stop signal to the driving control section when the characteristic value reaches a value corresponding to an optimum position of the optical system in the autofocus control according to the characteristic value of the actuator measured by the measurement section while making the shape-memory alloy change the length in the extending mode after completion of the autofocus control.

11. An image capture device comprising:
the optical system drive device of claim 10; and
an imaging element for capturing an image formed via the optical system of the optical system drive device.

12. The image capture device of claim 11, further comprising a cooling mechanism for cooling the shape-memory alloy.

13. The image capture device of claim 11, wherein the shape-memory alloy has a wire shape of which a diameter is 10 to 100 μm.

14. An image capture device comprising:
the optical system drive device of claim 1; and
an imaging element for capturing an image formed via the optical system of the optical system drive device.

15. The image capture device of claim 14, further comprising a cooling mechanism for cooling the shape-memory alloy.

16. The image capture device of claim 14, wherein the shape-memory alloy has a wire shape of which a diameter is 10 to 100 μm.

17. A mobile device comprising the image capture device of claim 14 mounted thereon.

18. An optical system drive device comprising:
an optical system movable in a moving range;
an urging member urging the optical system in an optical axis direction;
a shape-memory alloy actuator for moving the optical system in the optical axis direction;
a current applying section for supplying a current to the actuator;
a measurement section for measuring a characteristic value of the actuator;
a driving control section for controlling the supply current to the current applying section according to the characteristic value measured by the measurement section; and
a signal output section for outputting a prescribed signal to the driving control section when the characteristic value of the actuator measured by the measurement section reaches a value corresponding to a target position of the optical system while making the shape-memory alloy of the actuator change the length at least in an extending mode when moving the optical system to the target position,
wherein the signal output section outputs a first stop signal to the driving control section when the characteristic value of the actuator measured by the measurement section reaches a value corresponding to an initial position where the optical system is to be held while making the shape-memory alloy change the length in the extending mode, after completion of calibration control for setting the characteristic value in relation to a movable range of the optical system from a minimum position to a maximum position along the optical axis, before initiating autofocus control for moving the position of the optical system in a stepwise fashion according to the characteristic value of the actuator.

* * * * *